April 30, 1946.  S. KROLL ET AL  2,399,359
BABY CARRIAGE
Filed Dec. 8, 1944  3 Sheets-Sheet 1

INVENTOR.
Samuel Kroll & Nathan J. Kroll
BY
Their Attorney

INVENTOR.
Samuel Kroll & Nathan J. Kroll

April 30, 1946. S. KROLL ET AL 2,399,359
BABY CARRIAGE
Filed Dec. 8, 1944 3 Sheets-Sheet 3
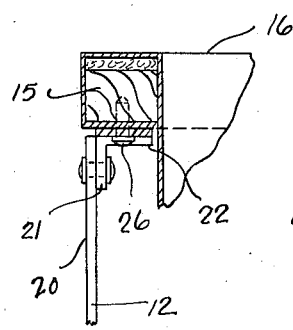
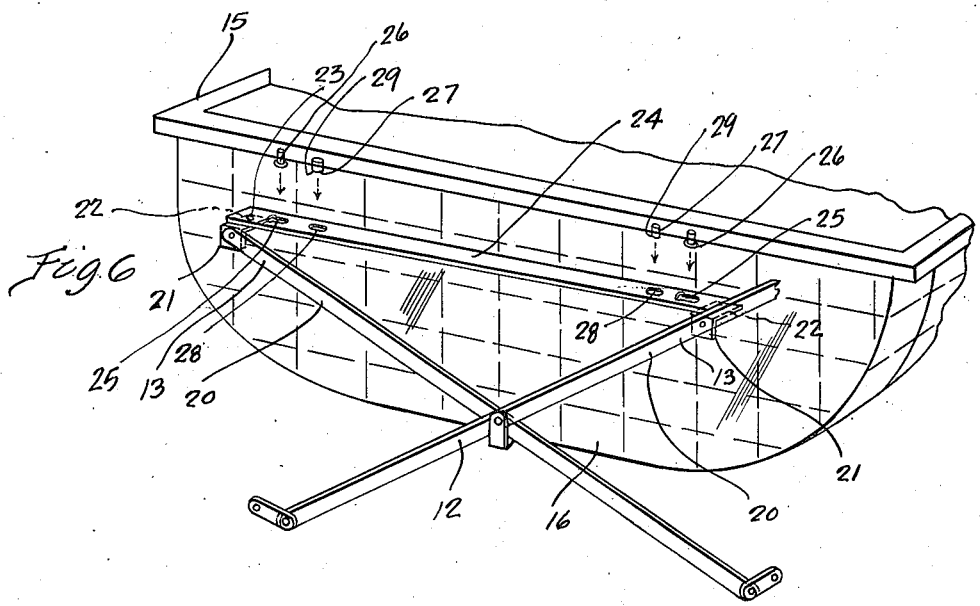
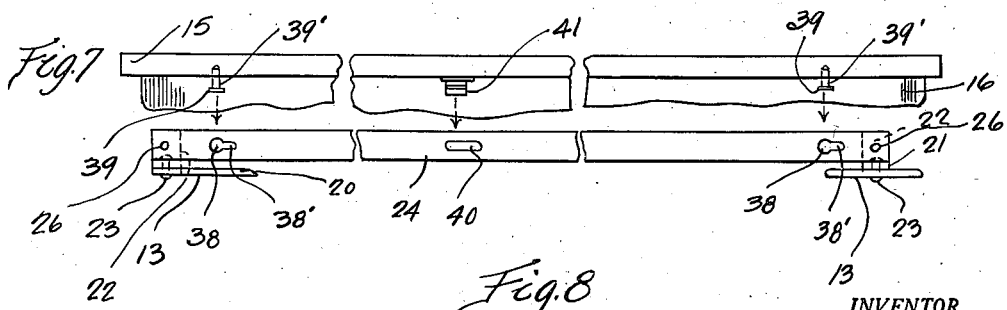
INVENTOR.
Samuel Kroll & Nathan J. Kroll
BY
Their Attorney Patented Apr. 30, 1946

2,399,359

UNITED STATES PATENT OFFICE 2,399,359

BABY CARRIAGE

Samuel Kroll and Nathan J. Kroll, Chicago, Ill.

Application December 8, 1944, Serial No. 567,144

10 Claims. (Cl. 280—36)

This invention relates to certain new and useful improvements in baby carriages. More specifically the invention relates to a baby carriage having a collapsible body which is detachably supported upon the chassis of the carriage in a manner such that the body may be readily and easily removed either in its collapsed or extended condition.

The present invention has for its principal object the provision of an improved construction of this character, which will be highly efficient in use and economical in manufacture.

This invention is an improvement over that shown and described in our copending applications, Serial No. 533,132, filed April 28, 1944; Serial No. 533,133, filed April 28, 1944; Serial No. 542,125, filed June 26, 1944; Serial No. 539,617, filed June 10, 1944.

The present invention has as a salient object to provide, in connection with the collapsible chassis of a baby carriage, supporting members upon which the carriage body may be positioned and detachably connected thereto in a manner such as will permit easy and ready removal of the carriage body from the chassis for placement in, for example, an automobile upon one of the seats thereof or with one end of the carriage resting upon the back of the front seat of the automobile and the opposite end resting upon the back seat.

Yet a further and equally important object of the invention is to provide a detachable carriage body with means for retaining the body in extended and substantially taut condition, the means being so related to the body as to permit expeditious and easy operation thereof by the user.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 5 is a fragmentary sectional detail view of the supporting bar embodied in the invention;

Fig. 6 is a fragmentary perspective view of a portion of the carriage chassis and a portion of the carriage body in distended relation with respect to each other;

Fig. 7 is a fragmentary side elevational view of the carriage body illustrating a modified form of construction over that shown in Fig. 6; and Fig. 8 is a fragmentary top plan view of one side of the chassis structure illustrating a slightly modified form of construction over that shown in Fig. 6.

The drawings illustrate the preferred form of construction by which the several objects of our invention are accomplished.

Figure 1:
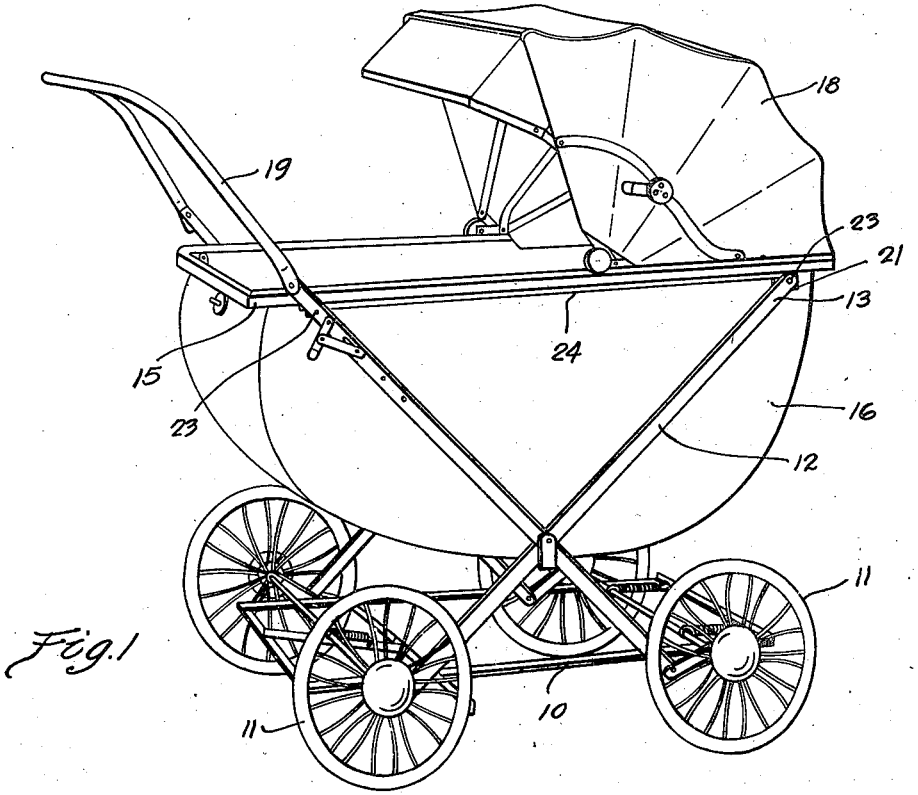
Fig. 1 is a perspective view of a baby carriage having incorporated therein the improvements constituting this present invention.
Figure 2:
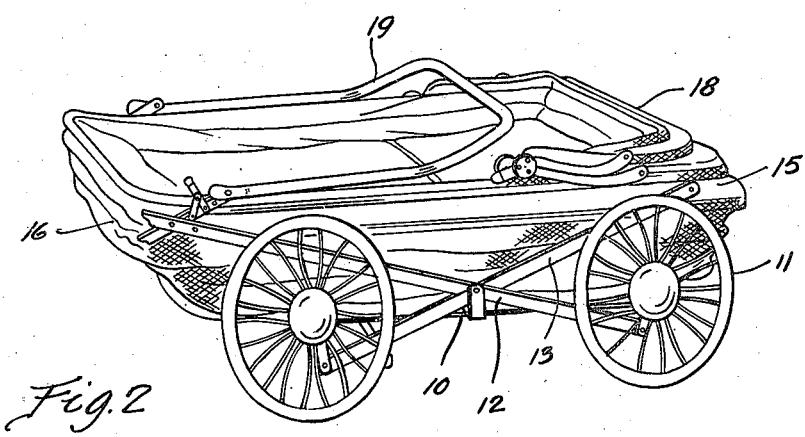
Fig. 2 is a perspective view of the baby carriage in a collapsed condition.

In this connection we have illustrated in Figs. 1 and 2 a conventional baby carriage comprising a chassis structure 10 supported by wheels 11. This chassis structure 10 comprises side scissors frames 12, and each pair of scissors frames at the top portions 13 thereof support a supporting bar 24, the said bar being more fully described hereinafter.

These bars 24 are adapted to have seated thereon a rigid frame 15 of the carriage body 16. This carriage body 16 has confined therein a footwell 17 (Fig. 4) and is preferably formed of flexible material so that the body 16 may be readily collapsed to the position shown in Fig. 2. The body supports the usual canopy or hood 18, and the chassis has secured thereto a pivotally supported handle 19. The chassis 10 is preferably, though not necessarily, constructed in accordance with that disclosed in our Patent No. 2,292,132, dated August 4, 1942. As our invention does not specifically relate to this chassis structure, only so much thereof as is necessary for an understanding of the present invention will be described, and reference to the aforesaid patent for a further description of the chassis structure may be had.

In the present instance there is pivotally secured to each of the bars 20 of the scissors frames 12 a lug 21 having a horizontal extension 22. To these extensions 22 there is connected as at 23 the supporting bar 24 extending in the direction of the length of the body 16. In the form shown in Figs. 5 and 6, at each end of the bar 24 there is provided a key slot 25 into which is adapted to fit a head-bearing pin 26, so that when the pin 26 is properly fitted into the key slot 25, the body 16 will be held rigidly upon the bar 24, it being understood that each scissors frame 12 of the chassis 10 is provided with such a bar 24. In lieu of this pin and slot connection there may be provided a button and slot connection indicated at 27 and 28. The button 27 is of the type known in the art as the "twist" button, having a head portion 29 which, after the button is projected through the slot 28, may be twisted to a position to prevent withdrawal of the button 27 from the slot 28.

The structure thus described provides a very simple and inexpensive means of detachably connecting the rigid frame 15 of the carriage body 16 to the scissors frames 12 of the chassis structure 10.

Figure 3:
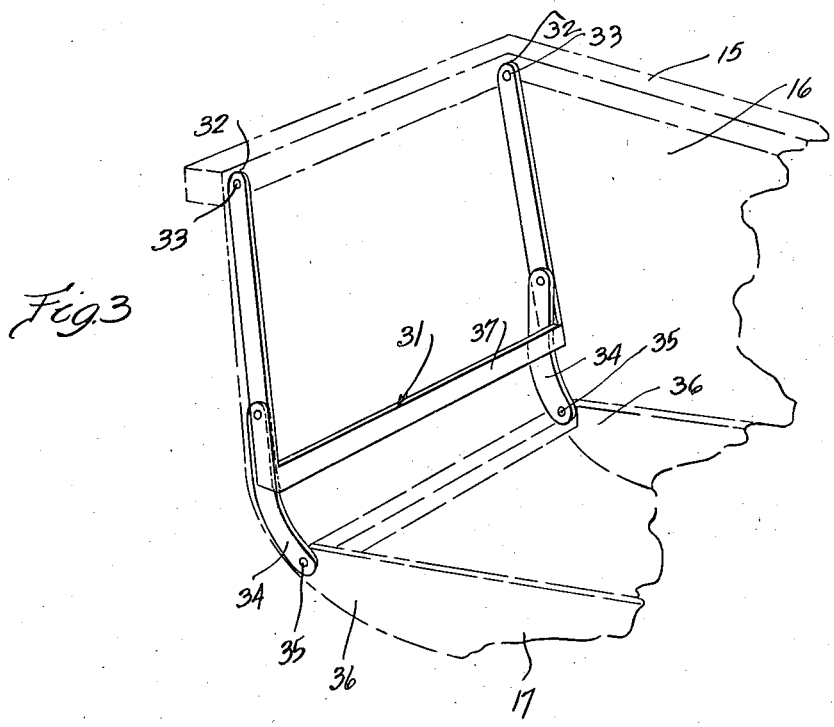
Fig. 3 is a perspective view of a body stay embodied in the invention.
Figure 4:
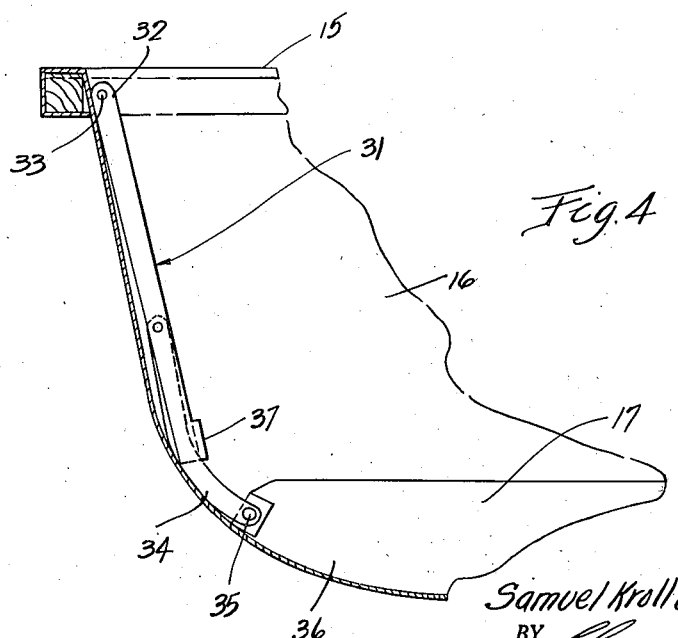
Fig. 4 is a fragmentary sectional detail view of the carriage body showing the body stay associated therewith.

To maintain the body 16 in an extended and substantially taut condition, we provide at each end of the body 16 stay structures 31. Each of these stay structures 31 is in the form of toggles having corresponding end portions 32 connected as at 33 to the rigid frame 15, with their lower end portions 34 connected as at 35 to adjacent walls 36 of the footwell 17. These toggles are connected together by a handle bar 37 (Figs. 3 and 4). The arrangement is such that when the body is in extended position, by reason of the fact that the parts of the toggles are in substantially straight alignment, the handle bar 37 will limit their pivotal movement relative to each other, while thus holding the body 16 in extended and substantially taut condition. However, to collapse the body, it is only necessary to grasp the handle bar 37, pivoting the toggle structure parts relative to each other to dispose the flexible body 16 in the position shown in Fig. 2.

In the construction of the baby carriage, it is obvious that there will be a body stay, such as 31, at each end of the body 16. In this manner a very simple and expeditious arrangement is provided for facilitating collapsing of the body 16.

In use, should the user of the carriage desire that the baby carriage be placed upon the seat of an automobile, the user simply detaches the carriage body 16 from the supporting bars 24, and in the extended position of the body 16, places the body within the automobile. The chassis then can be collapsed and stored in the trunk of the automobile.

By the use of the construction herein described, it is clear that to collapse the body requires but one movement, namely, that of the user grasping the handle bars 37 at each end of the carriage body 16 and pivoting the parts of the toggle structure in collapsing direction so as to facilitate collapsing of the body 16.

In Figs. 7 and 8, we have shown a slightly modified form of construction for connecting the rigid frame 15 to the supporting bars 24. In this construction there is formed at each end of the bar 24 a key slot 38 into which a head-bearing pin 39 is adapted to fit. Intermediate the end portions of the bar 24, there is provided an elongated slot 40 into which is adapted to fit a twist button 41 carried by the rigid frame 15, the slot being of such length as to permit the shifting of the pins 39 in the slots 38 to dispose the shanks 39' thereof in the narrow portions 38' of the slots 38.

From the foregoing, it is obvious that we provide a baby carriage which will be highly efficient in use and economical in manufacture.

While we have illustrated and described the preferred form of construction for carrying our invention into effect, this is capable of variation and modification without departing from the spirit of the invention. We therefore do not wish to be limited to the precise details of construction set forth, but desire to avail ourselves of such variations and modifications as come within the scope of the appended claims.

Having thus described our invention, what we claim as new and desire to protect by Letters Patent is:

1. A baby carriage comprising a collapsible wheel bearing chassis having oppositely disposed supporting members arranged in substantially spaced parallel relation with respect to each other and extending in a direction lengthwise with respect to the chassis, a collapsible carriage body having side members adapted to be positioned upon said supporting members, means for detachably connecting said carriage body to said supporting members to permit ready removal of the body from said supporting members, substantially as described, said connecting means including slot and twist-button connections between the side members and the supporting members.

2. A baby carriage comprising a collapsible wheel bearing chassis having oppositely disposed supporting members arranged in substantially spaced parallel relation with respect to each other and extending in a direction lengthwise with respect to the chassis, a collapsible carriage body having side members adapted to be positioned upon said supporting members, means for detachably connecting said carriage body to said supporting members to permit ready removal of the body from said supporting members, substantially as described, said connecting means including slot and twist-button and slot and pin connections between the side members and the supporting members.

3. A baby carriage comprising a wheel bearing chassis having oppositely disposed supporting members arranged in substantially spaced parallel relation with respect to each other and extending in a direction lengthwise with respect to the chassis, a carriage body having side members adapted to be positioned upon said supporting members, means for detachably connecting said carriage body to said supporting members to permit ready removal of the body from said supporting members, substantially as described, said connecting means comprising a slot and twist-button connection between each of the side members and their respective supporting members located between the opposite ends of each of said side members, and a slot and pin connection at opposite ends of each of said side members and each of said supporting members.

4. A baby carriage comprising a collapsible wheel bearing chassis provided at its upper end portion with spaced supporting members, a collapsible carriage body having side members adapted to be positioned upon said supporting members, means for detachably connecting said carriage body to said supporting members to permit ready removal of the body from said supporting members, substantially as described, said connecting means including slot and twist-button connections between the side members and the supporting members.

5. A baby carriage comprising a collapsible wheel bearing chassis provided at its upper end portion with spaced supporting members, a collapsible carriage body having side members adapted to be positioned upon said supporting members, means for detachably connecting said carriage body to said supporting members to permit ready removal of the body from said supporting members, substantially as described, said connecting means including slot and twist-button and slot and pin connections between the side members and the supporting members.

6. A baby carriage comprising a collapsible wheel bearing chassis provided at its upper end portion with spaced supporting members, a collapsible carriage body having side members adapted to be positioned upon said supporting members, means for detachably connecting said carriage body to said supporting members to permit ready removal of the body from said supporting members, substantially as described, said connecting means comprising a slot and twist-button connection between each of the side members and their respective supporting members located between the opposite ends of each of said side members, and a slot and pin connection at opposite ends of each of said side members and each of said supporting members.

7. A carriage of the class described including a carriage body comprising a rigid frame and a flexible body portion extending from the frame, means for retaining said flexible body portion in extended and substantially taut position including a body stay at each end of the body portion, each of said stays comprising parallel arms joined together at their lower end portions, means connecting the upper end portions of the arms to the frame, and link members pivotally connected to the arms adjacent their lower end portions and to adjacent portions of the bottom of said carriage body.

8. A carriage of the class described including a carriage body comprising a rigid frame and a flexible body portion extending from the frame, means for retaining said flexible body portion in extended and substantially taut position including a body stay at each end of the body portion, each stay comprising toggle structures, means connecting said toggle structures together, means connecting the upper end portions of the toggle structures to said frame, and means for connecting the lower end portions of the toggle structures to adjacent portions of said carriage body.

9. A carriage of the class described including a carriage body comprising a rigid frame and a flexible body portion extending from the frame, a footwell positioned in the bottom of said body portion, means for retaining said flexible body portion in extended and substantially taut condition including a body stay at each end of the body portion, each stay comprising toggle structures having their upper end portions connected to the frame and their lower end portions connected to the footwell, and a handle bar connecting the toggle structures together.

10. A carriage of the class described including a carriage body comprising a rigid frame and a flexible body portion extending from the frame, a footwell positioned in the bottom of said body portion, means for retaining said flexible body portion in extended and substantially taut condition including a body stay at each end of the body portion, each stay comprising toggle structures having their upper end portions connected to the frame and their lower end portions connected to the footwell, and a handle bar connecting the toggle structures together, said handle bar serving to limit relative pivotal movement of the toggle structures in one direction.

SAMUEL KROLL.
NATHAN J. KROLL.